US006015038A

United States Patent [19]

Stöxen et al.

[11] Patent Number: 6,015,038

[45] Date of Patent: Jan. 18, 2000

[54] HANDRAIL MONITORING SYSTEM

[75] Inventors: Oliver Stöxen, Seelze; Martin Mehlert, Nienstaedt, both of Germany

[73] Assignee: Otis Elevator Company, Farmington, Conn.

[ * ] Notice: Under 35 U.S.C. 154(b), the term of this patent shall be extended for 194 days.

[21] Appl. No.: 08/574,792

[22] Filed: Dec. 19, 1995

[51] Int. Cl.[7] ....... B65G 43/00

[52] U.S. Cl. ....... 198/322; 198/323; 198/810.02

[58] Field of Search ....... 198/322, 323, 198/810.02

[56] References Cited

U.S. PATENT DOCUMENTS

| | | | |
|---|---|---|---|
| 2,649,955 | 8/1953 | Buckeridge et al. | 198/322 |
| 3,834,524 | 9/1974 | Ratz et al. | 198/810.02 |
| 3,899,071 | 8/1975 | Duffy | 198/810.02 |

FOREIGN PATENT DOCUMENTS

| | | | |
|---|---|---|---|
| 0436191 | 7/1991 | European Pat. Off. . | |
| 1114916 | 12/1986 | Japan | 198/810.02 |
| 3098990 | 4/1991 | Japan | 198/323 |
| 5246676 | 9/1993 | Japan | 198/323 |
| 5286681 | 11/1993 | Japan . | |

*Primary Examiner*—Jospeh E. Valenza

[57] ABSTRACT

A monitoring device for a handrail of a passenger conveyor includes a plurality of electrical conductors extending through the handrail, a device for inducing a current within the conductors, and a device for monitoring the induced current. In a particular embodiment, tension carriers within the handrail are electrically spliced together to form the electrical conductors. The level of current detected within the handrail is compared to an acceptable range and, if the monitored level is not acceptable, the passage conveyor is stopped.

13 Claims, 2 Drawing Sheets

*fig. 2*
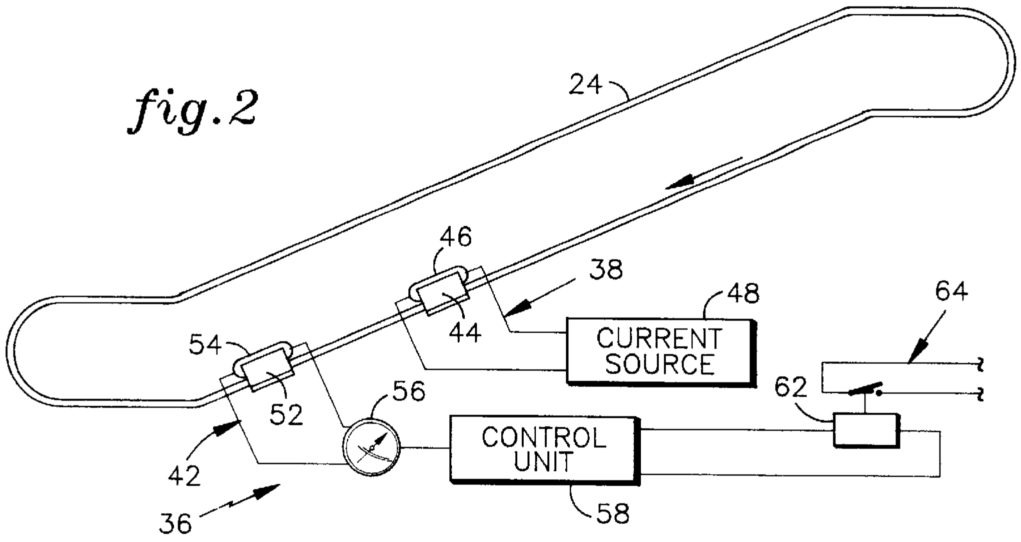
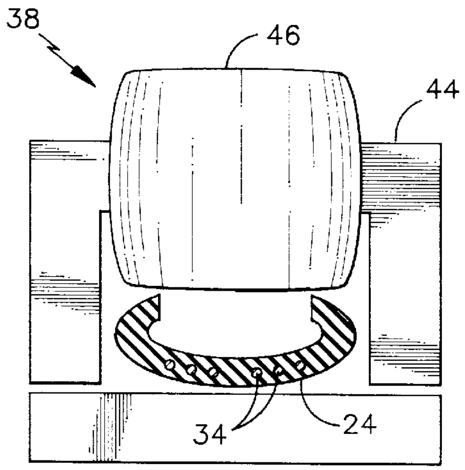
*fig. 4*
*fig. 3*
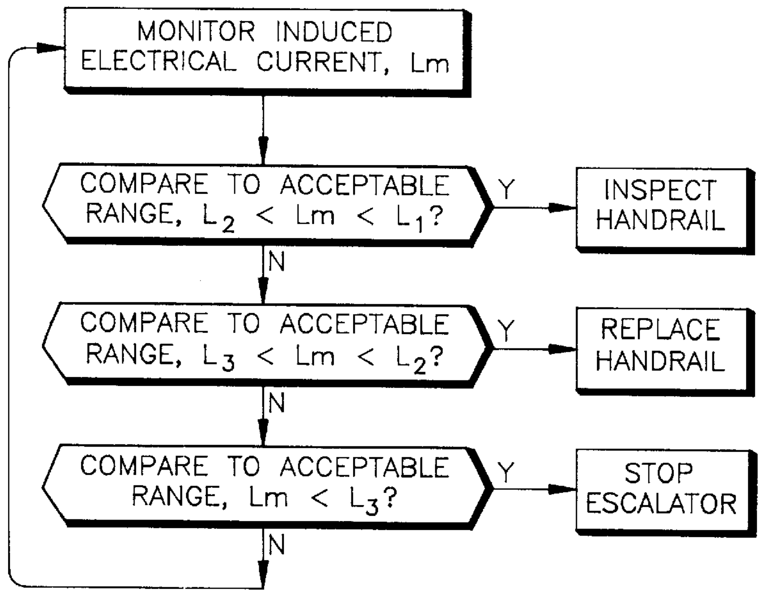

HANDRAIL MONITORING SYSTEM

TECHNICAL FIELD

The present invention relates to passenger conveyors, and more particularly to devices for monitoring the condition of a handrail of such a conveyor.

BACKGROUND OF THE INVENTION

A typical passenger conveyor, such as an escalator or a moving walk, includes a truss, a treadplate assembly driven through a loop by a machine, and a pair of balustrades extending along opposite sides of the treadplate assembly. Each balustrade includes a moving handrail that travels at the same speed as the treadplate assembly and enhances the safety and comfort of the passengers riding the conveyor.

The handrails are formed from a length of non-metallic material that is spliced together to form an endless band. The handrails are typically driven by a handrail drive assembly that is connected to the same machine that drives the treadplate assembly. Each handrail is tensioned over the outer edges of the balustrade in order to provide sufficient friction for the operation of the handrail drive assembly. Tension carriers, usually steel wire, are embedded in the handrail to accommodate the tension forces on the handrail.

Failure of the tension carriers may lead to an unacceptable operating condition. If the handrail stretches, the handrail drive assembly may not be able to drive the handrail at the same speed as the treadplate assembly, thus leading to discomfort of the passengers. If the handrail breaks, the handrail drive assembly will only drive the handrail until the point of the break reaches the handrail drive assembly. This will stop the handrail and leave the outer edge of the balustrade exposed.

Handrail monitoring devices have been used to determine if a failure has occurred in the handrail. These devices typically include a roller mounted on a resilient arm that is urged against the handrail. If a break has occurred, the resilient arm will move and actuate a switch to trigger the conveyor to stop. In addition, the speed of the handrail may be monitored through the rotation of the roller and if the measured speed varies from a predetermined speed, the conveyor may be shut down. A limitation of these types of devices, however, is that they wear over time and this wear may lead to improper operation and unnecessary stopping of the conveyor. In addition, any breaks in the handrail will not be detected until the location of the break reaches the monitoring device. At that point, most of the handrail may have been pulled off of the conveyor.

The above art notwithstanding, scientists and engineers under the direction of Applicant's Assignee are working to develop devices that effectively monitor the operational condition of conveyor handrails and are responsive to indications of degradation in the handrail.

DISCLOSURE OF THE INVENTION

According to the present invention, a handrail monitoring device includes means for inducing an electrical current in one or more conductors extending through the handrail and means to monitor the induced current.

Monitoring the induced electrical current provides the advantage of being able to monitor the physical condition of the handrail without direct contact. As a result, wearing of the monitoring device is of less concern. Another advantage is that the induced current will change due to a break or rupture anywhere in the handrail. This break or rupture will be detected immediately by the present invention and the handrail drive may be stopped quickly in response to the detected break or rupture. There is no need for the damaged region of the handrail to have to pass through the monitoring device before the break is detected, as in prior art devices.

In one particular embodiment of the present invention, the conductors within the handrail also function as the tension carriers within the handrail. This embodiment has the advantage of making use of the tension carriers already present within a typical handrail by electrically closing each tension carrier into a circuit. If any of the tension carriers should fail, the monitoring device would detect the failure and appropriate maintenance may be performed.

In another particular embodiment, the handrail monitoring device includes a control system and a safety circuit. The control system compares the outputs from the monitoring means to a range of acceptable values for the induced current. If the measured current exceeds the range of acceptable values, a relay is triggered to actuate a switch in the safety circuit and thereby shut off the handrail drive. According further, a method of monitoring the condition of the handrail includes the following steps: inducing a current in the conductors within the handrail, measuring the induced current, comparing the measured current to a predetermined acceptable range of current, and stopping the handrail if the measured current exceeds the acceptable range.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 2 is a schematic illustration of a handrail monitoring system according to the invention.

FIG. 3 is a functional block diagram of a method to monitor a handrail of a passenger conveyor.

FIG. 4 is a cross-sectional view of a handrail.

BEST MODE FOR CARRYING OUT THE INVENTION

Figure 1:
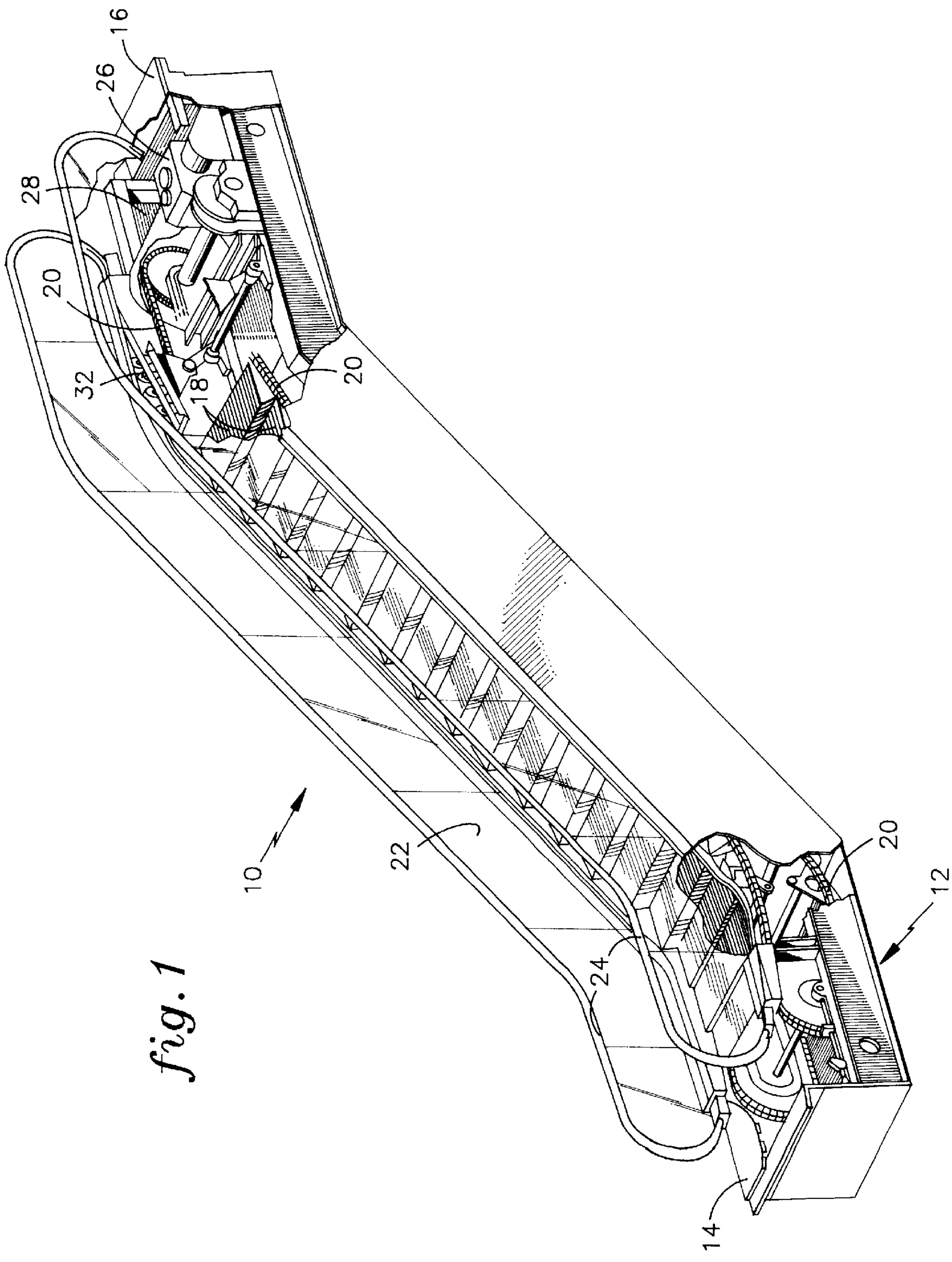
FIG. 1 is a perspective view of an escalator.

FIG. 1 shows an escalator 10 as an exemplary embodiment of a passenger conveyor, which is used to describe the present invention. It should become apparent in the ensuing description that the invention is applicable to other passenger conveyors having moving handrails, such as moving walks. The escalator 10 includes a truss 12 extending between a lower landing 14 and an upper landing 16, a plurality of sequentially connected treadplates 18 connected to a step chain 20 and traveling through a closed loop path within the truss 12, a pair of balustrades 22 having handrails 24, and a machine 26 for driving the treadplates 18 and handrails 24. The machine 26 is located in a machine space 28 under the upper landing 16.

Each balustrade 22 extends along opposite sides of the exposed portion of the treadplate 18 assembly. Each handrail 24 is slidingly engaged with the outer edge of the balustrade 22 and is driven through an endless loop by a handrail drive 32. The handrail drive 32 is typically driven off the machine 26 for coordinated movement of the handrail 24 with the treadplate 18 assembly. Coordinating the movement of the handrail 24 with the treadplates 18 significantly adds to the comfort of the passengers.

The handrail 24 is formed from a shaped elastomer material, as shown in FIG. 4. Embedded within the handrail 24 are a plurality of steel reinforcements 34 that extend longitudinally along the entire length of the handrail 24. Each handrail 24 is formed by extruding the elastomer material, with the embedded reinforcements 34, in the desired cross-sectional shape. The extruded structure is then cut to the length required for the specific application and the ends of the cut length of the structure are then spliced together to make the handrail 24. During the splicing process, the individual steel reinforcements 34 are also spliced together to define a plurality of closed loop, electrical conductors.

During operation of a conventional escalator 10, the handrail 24 may stretch. Stretching may cause the handrail 24 to move at a different speed than the treadplates 18 and lead to discomfort of the passengers. In extreme situations, the handrail 24 may fail and, if not monitored, the handrail drive 32 will pull the handrail 24 off the balustrade 22. In addition, the handrail 24 will accumulate within the truss 12 and possibly lead to other damage to the escalator 10.

To prevent such occurrences, in the escalator according to the present invention a handrail monitoring device 36 is incorporated into the escalator 10. The handrail monitoring device 36 includes an inducting means 38 and a monitoring means 42, each located at separate points along the path of the handrail 24.

As shown in FIG. 4, the inducting means 38 includes a core 44, a coil 46, and a current source 48. The core 44 is disposed in the traveling path of the handrail 24 and encompasses a portion of the handrail 24 as it travels through the path. The coil 46 is disposed about the core 44 and is electrically connected to the current source 48. The core 44, coil 46 and current source 48 define means to induce an electrical current in the steel reinforcements 34 sufficient to be detected by the monitoring means 42. For comfort, the induced current in the reinforcements 34 should be below the level that is perceivable by the passengers holding the handrail 24.

The monitoring means 42 passively detects the induced current in the steel reinforcements 24. The monitoring means includes a core 52, a coil 54, a current sensing device 56, a control unit 58, and a relay 62. As with the core 44 of the inducting means 38, the core 52 is disposed in the traveling path of the handrail 24 and encompasses a portion of the handrail 24 as it travels through the path. The coil 54 is disposed about the core 52 and is electrically connected to the current sensing device 56. The current sensing device 56 communicates with the control unit 58. The control unit 58 includes the logic for evaluating the signals from the current sensing device 56 and controls the actuation of the relay 62 in response to those signals. The relay 62 is incorporated into the safety circuit 64 of the escalator 10 and opens and closes as commanded by the control unit 58.

During operation of the escalator 10, the handrail monitoring device 36 continually monitors the condition of the handrail 24 and controls the operation of the escalator 10 in response the perceived condition, as shown in the functional diagram of FIG. 3. Specifically, the current source 48 generates an electrical current in the inducting coil 46, which in conjunction with the inducting core 44 induces an electrical current in the steel reinforcements 34 in the handrail 24. This induced current is present throughout the entire length of the handrail 24 and is detected by the monitoring core 52 and coil 54. The level of the induced current is determined by the current sensing device 56 and a signal Lm indicative of this measured level is communicated to the control unit 58.

Within the control unit 58, the measured level Lm is compared to a range of predetermined acceptable levels for the induced current. If the measured level is not within a minimal acceptable range $L(Lm>L_3)$, the control unit 58 actuates the relay 62 and the escalator 10 is stopped. If the measured level Lm is within the minimal acceptable range, the relay 62 is not actuated and the operation of the escalator 10 continues.

The determination of the specific range of acceptable values for the induced current will depend upon the sensitivity required for each specific application. If it is desired to only stop the escalator in the event of a failure of the handrail, i.e., a break somewhere in the handrail, this may be sensed by simply using a predetermined minimum value for the measured induced current. If a failure occurs, the closed loop circuit defined by the reinforcements no longer exists and the inducing means will not be able to induce a current in the reinforcements. Regardless of the location of the failure, this will be sensed immediately by the monitoring means and the handrail drive can be shut off before a significant portion of the handrail is pulled through the handrail drive.

If, on the other hand, it is desired to stop the operation of the escalator in the event that a predetermined number of the plurality of reinforcements have failed, the minimum threshold for the measured current may be higher. This would permit the escalator to be stopped in the event that the minimum number of reinforcements have failed. For example, if the handrail has six reinforcements and the predetermined minimum number for operation of the escalator is three, the minimum threshold for the measured current may be set to correspond to the level of current induced in only three of the reinforcements. In this way, the handrail may be replaced before a failure of the handrail occurs.

In addition, the control logic may be configured to respond differently to different measured levels of induced current, as illustrated in FIG. 3. At one level of degradation in the measured current, $(L_2<Lm<L_1)$ the control unit could provide a signal that the handrail should be inspected; at a second level of degradation $(L_3<Lm<L_2)$, another signal could be provided to indicate that the handrail should be replaced; and finally, if a minimum level of measured current is not met $(Lm<L_3)$, the escalator is shut down.

The embodiment shown in FIGS. 1–4 and described above uses the steel reinforcements as the electrical conductors within the handrail. This embodiment provides the simplicity of combining the handrail reinforcement and electrical conductor functions into a single element. As an alternative, however, separate electrical conductors may be embedded within the handrail and spliced together to provide the closed loop electrical circuits. In this embodiment, the functions of handrail reinforcement and electrical conductivity are separated such that the reinforcements may be optimized for their specific function and the electrical conductors may be optimized for their specific function.

Although the invention has been shown and described with respect to exemplary embodiments thereof, it should be understood by those skilled in the art that various changes, omissions, and additions may be made thereto, without departing from the spirit and scope of the invention.

What is claimed is:

1. A handrail monitoring device for a handrail, the handrail being driven through a closed loop by a drive machine, the monitoring device including:

one or more conductors extending through the handrail;

means for inducing an electrical current in the one or more conductors; and means to monitor the induced current.

2. The handrail monitoring device according to claim 1, wherein the means to monitor the induced current includes means to detect changes in the induced current.

3. The handrail monitoring device according to claim 2, wherein the means to monitor the induced current includes means to compare the monitored current to an expected current and means to stop the drive machine if the monitored current varies from the expected current by more than a predetermined amount.

4. The handrail monitoring device according to claim 3, wherein the means to stop the motion of the handrail includes a switch integrated into the drive machine, and wherein the switch is actuated by the means to monitor the induce current if the monitored current varies from the expected current by more than the predetermined amount.

5. The handrail monitoring device according to claim 1, wherein the one or more conductors are tension carriers embedded within the handrail.

6. The handrail monitoring device according to claim 1, wherein the means to induce the electrical current in the conductors is an inductor having a coil and a core disposed about a portion of the travel path of the handrail.

7. The handrail monitoring device according to claim 1, wherein the means to monitor the induced current includes a measuring coil disposed about a portion of the travel path of the handrail.

8. A handrail for a passenger conveyor, the handrail defining a continuous loop, the handrail including one or more conductors that extend longitudinally through the handrail to form an electrically closed, continuous loop, such that an electrical current may be induced in the one or more conductors.

9. The handrail according to claim 8, wherein the one or more conductors are tension carriers embedded within the handrail.

10. A method to monitor a passenger conveyor handrail, the handrail including one or more conductors extending longitudinally through the handrail to form an electrically closed loop, the method including the steps of:

inducing a current in the one or more conductors;

measuring the induced current;

comparing the measured current to a predetermined level of current; and generating a signal if the measured current is less than the predetermined level of current.

11. The method according to claim 10, wherein the signal triggers the stopping of the operation of the passenger conveyor.

12. The method according to claim 10, further including the steps of:

comparing the measured current to a second predetermined level of current, the second predetermined being less than the first predetermined level of current; and generating a second signal if the measured current is less than the second predetermined level of current;

wherein the first generated signal indicates that inspection of the handrail is required, the second generated signal triggers the stopping of the operation of the passenger conveyor.

13. The method according to claim 12, further including the steps of:

comparing the measured current to a third predetermined level of current, and generating a third signal if the measured current is less than the third predetermined level of current;

wherein the third signal indicates that replacement of the handrail is required.

* * * * *